United States Patent
Edmond et al.

(10) Patent No.: US 12,455,239 B2
(45) Date of Patent: Oct. 28, 2025

(54) IDENTIFICATION OF π-INTERACTIONS OF MESOPHASE FORMATION, AND METHODS RELATED THERETO

(71) Applicant: ExxonMobil Technology and Engineering Company, Annandale, NJ (US)

(72) Inventors: Kazem V. Edmond, Lebanon, NJ (US); David L. Perkins, Wind Gap, PA (US); Daniella Mendez, Cedar Grove, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 438 days.

(21) Appl. No.: 17/816,526

(22) Filed: Aug. 1, 2022

(65) Prior Publication Data
US 2024/0035972 A1   Feb. 1, 2024

(51) Int. Cl.
*G01N 21/64* (2006.01)
*G01N 33/28* (2006.01)

(52) U.S. Cl.
CPC ..... *G01N 21/6428* (2013.01); *G01N 33/2823* (2013.01)

(58) Field of Classification Search
CPC ........ G01N 21/00; G01N 21/62; G01N 21/63; G01N 21/64; G01N 21/6428; G01N 2021/6432; G01N 21/6408; G01N 21/6456; G01N 21/84; G01N 2021/8405; G01N 2021/8472; G01N 2021/6417; G01N 2021/6419; G01N 2021/6421;
(Continued)

(56) References Cited

U.S. PATENT DOCUMENTS 5,252,834 A * 10/1993 Lin ............... G01N 21/6408
356/318
5,880,830 A * 3/1999 Schechter ........ G01N 21/6456
250/461.1
(Continued)

OTHER PUBLICATIONS

Kershaw, et al., "A Comparison of Mesophase Formation Under Sparging and Vacuum," Carbon, vol. 33, Issue 5, 1995, pp. 633-643. (Year: 1995).*
(Continued)

*Primary Examiner* — Catherine T. Rastovski
*Assistant Examiner* — Matthew W. Baca
(74) *Attorney, Agent, or Firm* — C. Tumey Law Group PLLC

(57) ABSTRACT

Identification of aromatic interactions, e.g. π-interactions, of mesophase formation, and methods related thereto, including the use of fluorescent light and optical imaging and/or detection schemes for the identification of π-interactions of mesophase formation, and methods related thereto. Methods include interacting fluorescent light with a pitch composition; receiving fluorescent light emissions from the pitch composition; and detecting the onset of mesophase formation upon detecting a normalized fluorescence intensity ($I/I_0$) of the fluorescent light emissions in the range of about 0.4 to about 0.7 at a wavelength in the range of about 430 nm to about 470 nm for an exposure of about 1.5 seconds.

18 Claims, 4 Drawing Sheets

(58) Field of Classification Search
CPC .... G01N 33/00; G01N 33/2823; G01N 33/44; G01N 33/442
See application file for complete search history.

(56) References Cited

U.S. PATENT DOCUMENTS

| | | | |
|---|---|---|---|
| 2008/0200634 A1* | 8/2008 | Duffy | C08G 61/123 528/10 |
| 2016/0059151 A1* | 3/2016 | Olesik | D01D 5/0007 210/198.3 |
| 2016/0326339 A1* | 11/2016 | Liu | C08K 5/435 |
| 2017/0299601 A1* | 10/2017 | Giraldo Gomez | C09K 11/025 |
| 2019/0194828 A1* | 6/2019 | Atkins | C08F 10/06 |
| 2021/0115344 A1 | 4/2021 | Perkins et al. | |
| 2023/0416949 A1 | 12/2023 | Smith et al. | |
| 2024/0018418 A1 | 1/2024 | Smith et al. | |
| 2024/0068132 A1 | 2/2024 | Gopinadhan et al. | |
| 2025/0023045 A1 | 1/2025 | Gopinadhan et al. | |

OTHER PUBLICATIONS

Valdes-Aguilera, "Pyrene as a fluorescent probe for monitoring polymerization rates." Macromolecules 23.2 (1990): 689-692. (Year: 1990).*

Dumont, et al. "Chemical, microstructural and thermal analyses of a naphthalene-derived mesophase pitch." Carbon 40.9 (2002): 1475-1486. (Year: 2002).*

MF Sonnenschein, RG Weiss, (1989) Fluorescence Quenching of Pyrene as a Monitor of Intermolecular Diffusion and Intramolecular Chain Bending in Cholesterol Liquid Crystalline Phases (1).

T Faisal, et al., (2021) "Formation of Noncovalent Complexes between Complex Mixtures of Polycyclic Aromatic Hydrocarbons (Asphaltenes) and Substituted Aromatics Studied by Fluorescence Spectroscopy".

BA Flusberg, et al., (2005) "Fiber-optic fluorescence imaging".

Material Views, Yoon, et al., Mesomorphic Organization and Thermochromic Luminescence of Dicyanodistyrylbenzene-Based Phasmidic Molecular Disks: Uniaxially Aligned Hexagonal Columnar Liquid Crystals at Room Temperature with Enhanced Fluorescence Emission and Semiconductivity, 2012.

Quenching of Fluorescence, Chp8, Lakowicz, 2006.

Yoon, Seong-Jun, et al. "Mesomorphic Organization and Thermochromic Luminescence of Dicyanodistyrylbenzene-Based Phasmidic Molecular Disks: Uniaxially Aligned Hexagonal Columnar Liquid Crystals at Room Temperature with Enhanced Fluorescence Emission and Semiconductivity." Advanced Functional Materials Journal, vol. 22, Issue No. 1, Jan. 2012, pp. 61-69. PDF file. 9 pages.

Lakowicz, Joseph R. "Principles of Fluorescence Spectroscopy." Textbook, Chapter 8: Quenching of Fluorescence, pp. 277-327. (3rd ed. 2006). PDF file. 51 pages.

Flusberg, Benjamin A., et al. "Fiber-Optic Fluorescence Imaging." Nature Methods Journal, vol. 2, Issue No. 12, Dec. 2005, pp. 941-950. PDF file. 21 pages.

* cited by examiner

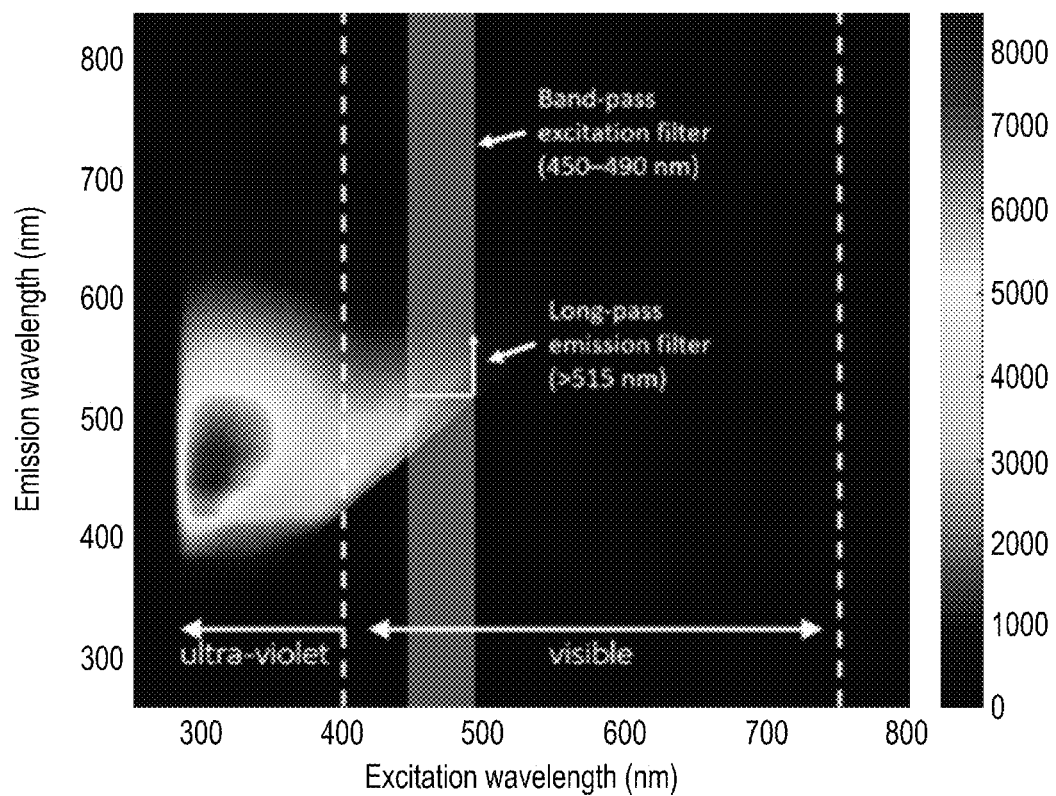
FIG. 2
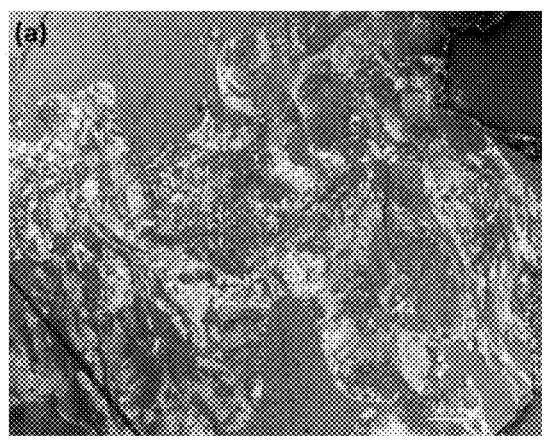 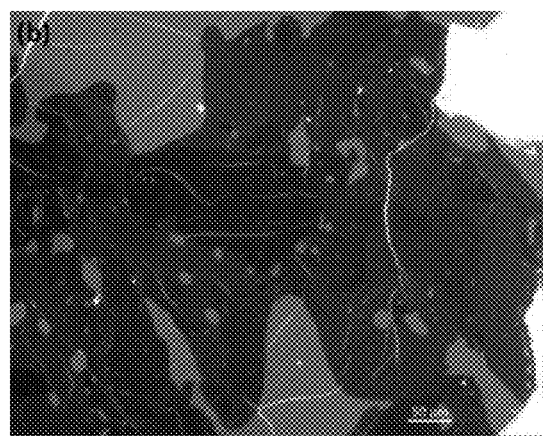
FIG. 3A  FIG. 3B

IDENTIFICATION OF π-INTERACTIONS OF MESOPHASE FORMATION, AND METHODS RELATED THERETO

FIELD OF INVENTION

This application relates to the identification of π-interactions of mesophase formation, and methods related thereto. More particularly, this application relates to the use of fluorescent light and optical imaging and/or detection schemes for the identification (including extrapolations) of heterogeneity in pitch properties and composition via the identification of n-interactions of mesophase formation, and methods related thereto.

BACKGROUND

Petroleum refineries produce fuels by atmospheric distillation or by cracking distillates produced from vacuum distillation, for example. These processes produce aromatic-rich petroleum residues that can be used for the production of pitch, for example, through a pyrolysis (heat) process, acid catalyst process, and the like. Pitch can be used as a starting material for producing an array of industrial and other carbon products, such as carbon fiber, graphite, binder pitch, impregnation pitch, and the like. Major markets for pitch include, but are not limited to, pitch high-performance and general purpose carbon fiber, refractories, carbon/carbon composites, synthetic graphite, and graphite parts; binder and impregnated pitch for electrodes; binder and impregnated aluminum production anodes and cathodes; impregnated pitch for steel electric arc furnace electrodes; meso-carbon microbeads for anodes for lithium ion batteries; carbon foam for heat transfer applications and sound absorbers; roofing products; lubricants; consumer products (e.g., cosmetics); and the like.

Mesophase (anisotropic) formation occurs during pitch production and also the production of many of the pitch-based products, such as carbon fiber production. Mesophase comprises a complex mixture of aromatic molecules that are at least partially ordered that coalesce into a liquid crystalline phase. Contrary to mesophase formation, the pitch or pitch-based product being produced may exist in an isotropic (amorphous) state, where the aromatic molecules are randomly oriented.

Depending on the downstream application of the pitch or pitch-based product, mesophase formation may be undesirable or desirable. For example, mesophase formation may be undesirable due to the loss of hydrogen in some instances, such as due to potential resultant fouling, coking, and other reliability concerns during fuel processes. Alternatively, mesophase formation may be desirable, such as a mesophase pitch for carbon fiber production, or mesophase formation during carbon fiber production, aiding in spinning of the carbon fiber.

Current methods rely on cross-polarized light microscopy (PLM) to detect and quantify mesophase, but PLM has certain inherent limitations because it highlights optically birefringent domains, which can only occur when large numbers of aromatic molecules have already coalesced to form a liquid crystalline phase, and the appearance of these domains is orientation-dependent, resulting in images that can be difficult to segment for quantitative characterization. Moreover, PLM requires a near smooth surface (e.g., via polishing or melting or other means) in order to obtain any discernable information.

The ability to detect, observe, and/or quantify the degree of association or interaction between planar aromatic molecules that lead to the onset, formation, and coalescence of a liquid crystalline mesophase is advantageous, such as for the design of processes in which mesophase formation can occur, whether undesirable or desirable.

SUMMARY OF INVENTION

In one or more aspects, the present disclosure provides a method including interacting fluorescent light with a pitch composition; receiving fluorescence emissions from the pitch composition; and detecting the onset of mesophase formation upon detecting a normalized fluorescence intensity ($I/I_0$) of the fluorescent light emissions in the range of about 0.4 to about 0.7 at a wavelength in the range of about 430 nm to about 470 nm for an exposure of about 1.5 seconds.

In one or more aspects, the present disclosure provides a method including interacting fluorescent light with a pitch composition; receiving fluorescence emissions from the pitch composition; obtaining a fluorescence spectrum; and detecting the onset of mesophase formation upon detecting a normalized fluorescence intensity ($I/I_0$) of the fluorescent light emissions in the range of about 0.4 to about 0.7 at a wavelength in the range of about 430 nm to about 470 nm for an exposure of about 1.5 seconds via a 20×/0.5 NA air objective lens.

In one or more aspects, the present disclosure provides a composition including a pitch composition, wherein when the pitch composition is interacted with fluorescent light has a normalized fluorescence intensity ($I/I_0$) of the fluorescent light emissions in the range of about 0.4 to about 0.7 at a wavelength in the range of about 430 nm to about 470 nm for an exposure of about 1.5 seconds via a 20×/0.5 NA air objective lens.

These and other features and attributes of the disclosed methods of identifying π-interactions in mesophase formation, the present disclosure and its advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

FIG. 1C differs from FIG. 1B in that it has been subjected to digital contrast enhancement, according to one or more aspects of the present disclosure.

FIG. 2 is a fluorescence spectrum of an isotropic pitch upon excitation spanning 300 nm and 750 nm, according to one or more aspects of the present disclosure.

FIG. 3A is a comparative optical micrograph of a mesophase pitch sample acquired using reflected cross-polarized light via a ¼ waveplate, according to traditional methods, the comparison being with FIG. 3B.

FIG. 3B is a comparative optical micrograph of the mesophase pitch sample of FIG. 3A acquired via fluorescent light excitation having digital contrast enhancement, according to one or more aspects of the present disclosure, the comparison being with FIG. 3A.

DETAILED DESCRIPTION

Figure 1A:
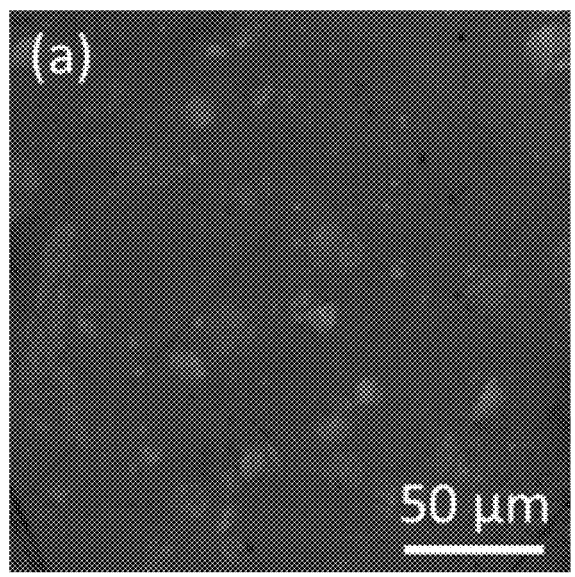
FIG. 1A is a comparative optical micrograph of a mesophase pitch sample acquired using reflected cross-polarized light via a full waveplate, according to traditional methods, the comparison being with FIGS. 1B and 1C.

This application relates to the identification of π-interactions of mesophase formation, and methods related thereto. More particularly, this application relates to the use of fluorescent light and optical imaging and/or detection schemes for the identification (including extrapolations) of heterogeneity in pitch properties and composition via the identification of π-interactions of mesophase formation, and methods related thereto.

As described above, it is desirable to detect, observe, and/or quantify the interactions of planar aromatic molecules that lead to the onset, formation, and coalescence of a liquid crystalline mesophase. Current methods, such as PLM, are limited in that they are only capable of detecting and quantifying mesophase formation after substantial coalescence of aromatic molecules (i.e., after the mesophase has already substantially formed), where the resultant images are difficult to segment for quantitative characterization, making the identification of heterogeneities within the phases difficult. The present disclosure addresses at least these issues, and provides other advantages.

The present disclosure provides methods for determining mesophase formation using fluorescent excitation to identify increased π-interactions, which result from the loss of hydrogen-rich side chains, a prerequisite for mesophase formation. Fluorescent light is susceptible to emission quenching, a physiochemical process that lowers the intensity of light emitted from fluorescent molecules, which can be the result of π-interactions, and therefore an indicator of the onset and continued formation of mesophase. Evaluation of fluorescent emissions for π-interactions determination (and mesophase formation) may be performed using optical micrographs, fluorescent detectors, fiber-optic fluorescent imaging, and the like, and any combination thereof.

Definitions and Test Methods

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature or "RT") is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure and the claims thereto, the following definitions shall be used.

As used herein, the term "mesophase," and grammatical variants thereof, refers to a complex mixture of aromatic molecules that are at least partially ordered that coalesce into a liquid crystalline phase. The term "mesophase" can be a general term meaning in between two phases. In this case, that transitory phase is a liquid crystalline phase.

As used herein, the term "isotropic," and grammatical variants thereof, is a complex mixture of aromatic molecules that are randomly oriented in an amorphous phase.

As used herein, the term "pitch," and grammatical variants thereof, is a complex viscoelastic blend of polynuclear aromatic hydrocarbons, which can be natural or manufactured, and includes petroleum pitch, coal tar pitch, natural asphalt, biomass pitch, and pitch obtained as a by-product in the naphtha cracking industry, for example.

The term "pyrolysis," and grammatical variants thereof, as used herein, refers to thermal decomposition due to high temperatures (e.g., dehydrogenation, cyclization, cracking, condensation, and the like).

The term "fluorescent light," and grammatical variants thereof, refers to electromagnetic radiation capable of fluorescing a substance, such as pitch for use in the present disclosure. Such fluorescent light may include, but is not limited to, ultraviolet (UV) light (having a wavelength of 10 nanometers (nm) to 400 nm), visible light (having a wavelength of 320 nm to 700 nm), and infrared light (having a wavelength greater than 700 nm), such as near infrared light (having a wavelength of infrared light (having a wavelength of 750 nm to 1400 nm).

The term "π-interaction," and grammatical variants thereof, refers to a noncovalent attractive force between any two or more aromatic molecules. Such π-interactions can increase with and even correlate to hydrogen loss during pyrolysis (molecular decomposition via high heating in the absence of oxygen) of pitch.

As used herein, the term "hydrogen to carbon ratio" or "H/C Ratio," and grammatical variants thereof, refers to an amount of elemental hydrogen to elemental carbon within a pitch composition. The H/C Ratio is measured according to ASTM D5291 (2021). The term may be used interchangeably with "spatial variation," and grammatical variants thereof.

The term "normalized fluorescence intensity" (represented by "$I/I_0$"), and grammatical variants thereof, refers to fluorescence intensity produced by a sample (e.g., pitch) upon fluorescent light excitation at room temperature.

As used herein, the term "reactor reaction zone" and "fiber reaction zone," and grammatical variants thereof, refer to an area in a production process in which pitch is pyrolyzed. They may be referred to herein collectively as "reaction zone."

As used herein, the term "carbon fiber," and grammatical variants thereof, refers to a material consisting of fibrous crystalline filaments produced from pitch.

Identification of Aromatic Interactions and Mesophase Formation

As provided above, mesophase formation in pitch and pitch-based products may be desirable (e.g., carbon fibers to improve their properties) or undesirable (e.g., to avoid fouling, coking, and other reliability concerns during fuel processes). However, current methods fail to provide a means to detect, observe, and/or quantify the degree of aromatic association or aromatic interactions that increase with pyrolysis en route to the onset, formation, and coalescence of a liquid crystalline mesophase in pitch and pitch-based products. Additionally, detection of mesophase formation via PLM requires careful sample preparation, including embedding and polishing, whereas fluorescence can be used to detect mesophase formation in the bulk. Most significantly, a means of quantifying the degree of aromatic association within pitch can highlight heterogenieties in its molecular composition and density.

Briefly, pitch may be prepared by (or otherwise the residual product of) pyrolysis of various feedstock sources, such as petroleum, coal tar, biomass tar, or from an acid-catalyzed oligomerization of small molecules (e.g., naphthalene), as described above, and is itself an intermediate product. The pyrolysis in the various methods described herein is performed in a pyrolysis reactor (a "reactor reaction zone") at a high temperature, such as a temperature in the range of about 300° C. to about 600° C., encompassing any value and subset therebetween, such as about 300° C. to about 400° C., or about 400° C. to about 500° C., or about 500° C. to about 600° C., in the presence of one or more gasses (e.g., argon, nitrogen, or other inert gases, and the like), and under pressure such as in the range of about 0.3 to 2,500 pounds per square inch (psi), or about from 0.3 to about 100 psi, or about 1 to about 75 psi, or about 5 to about 50 psi, or about 10 to about 25 psi, or about 50 to about 2,000 psi, or about 100 to about 1,500 psi, or about 200 to about 1,000 psi, or about 400 to about 1,000 psi, or about 500 to about 1,000 psi. Pyrolysis may be performed in the presence of one or more catalysts, which may also be utilized to reduce pyrolysis temperatures.

Briefly, carbon fibers may be prepared by pyrolyzing pitch at a temperature above its melting point, typically in the range of about 300° C. to about 600° C. (a "fiber reaction zone"), encompassing any value and subset therebetween, thereby melting the pitch, and continuously spinning the melted pitch as it is fed through a die. The resultant fibers may be stabilized using one or more oxidizing gasses, carbonized, and/or graphitized. Typically, the carbon fiber will have a diameter in the range of about 50 micrometers (μm) or less, such as about 50 μm to about 5 μm, or about 25 μm to about 5 μm, or about 10 μm to about 5 μm, encompassing any value and subset therebetween.

During pyrolysis for pitch production and/or pyrolysis for carbon fiber production, π-interactions are formed between the aromatic molecules therein due to a loss of hydrogen-rich side chains, which corresponds with mesophase formation. Given an increased association or interaction between neighboring aromatic rings (e.g., π-interactions), fluorescent light excitations that would have otherwise rendered an emission of light in response are likely to be quenched. With continued pyrolysis, further reducing the prevalence of hydrogen-rich side chains, the degree of aromatic association increases, increasing the likelihood of fluorescent quenching (i.e., further reducing the material's fluorescent intensity). Therefore, upon fluorescent excitation of pyrolyzing pitch, optical light imaging or fluorescent light detection can be used to detect the onset or presence of π-interactions, which as stated above, is a proxy for reduced hydrogen content, the lack thereof enabling the π-interactions and the onset of mesophase formation (see FIGS. 4A-4C). It is to be appreciated that while the current application focuses on detecting at least the onset of aromatic associations which result from pyrolysis, it may be used to detect, quantify, and evaluate the quality of mesophase pitch production at any stage, including upon the final pitch and/or final pitch-based product, without departing from the scope of the present disclosure.

Fluorescence and π-Interactions

Fluorescent light imaging or fluorescent imaging is a non-destructive technique in which a fluorescent light, as defined herein above, with a particular spectrum is interacted with a sample (e.g., an aromatic pitch, whether or whether not pyrolyzed), thereby fluorescently exciting the sample. Florescent light spectra may be obtained, for example, by optical imaging, fluorescence imaging, fluorescence spectrophotometer, fiber-optic detection, and the like, and any combination thereof. The excited sample emits light in response (fluorescence) as measured by normalized fluorescence intensity ($I/I_0$).

Fluorescence may operate by one of several mechanisms, or any combination thereof. For example, fluorescence may operate via excitation and relaxation of a molecule's (e.g., an aromatic molecule's) electronic state; typically, the relaxation of an electron to its ground state results in emission of a photon.

Alternatively, rather than relaxing to the molecule's electronic state, in some instances one or more electrons transfer to an excited state of a neighboring molecule that is in very close proximity, a natural phenomenon generally described as photo-induced electron transfer (PET). The electron transfer(s) in PET may be readily facilitated by π-interactions, enabling aromatic molecules to transfer their electrons via a mechanism known as the Dexter electron transfer (DET), which occurs over distances <10 Å, spanning the full length-scale over which π-interactions occur. The electron transfers described above result in fluorescent emissions outside of visible (or observable) wavelengths (380 nm to 700 nm), causing quenching of the fluorescent emissions.

Accordingly, fluorescent quenching (upon fluorescent light excitation) highlights the presence of π-interactions, whose propensity increases with the loss of hydrogen; the loss of hydrogen occurs with continued pyrolysis and the formation of mesophase. Therefore, the present disclosure provides a method of determining mesophase formation based on fluorescent quenching, whereby regions of fully realized liquid crystalline mesophase exhibit near total or total quenching of fluorescence emissions and the less-than-fully (including initial or onset) regions of liquid-crystalline mesophase will exhibit comparatively less quenching of fluorescence emissions. Moreover, variations in intensity may exist within a clearly mesophase region, e.g., as determined by PLM, which may indicate structural heterogeneity within the crystalline phase. These variations in π-interactions, and subsequently hydrogen content indicative of a mesophase state, may have significant rheological, thermal, and electrical conductivity implications, for example, on the resultant pitch and/or pitch-based products.

Imaging and Detection

According to one or more aspects of the present disclosure, by use of optical imaging and/or detection, in combination with fluorescent light interaction, direct identification of the regions of increased aromatic interactions, and thus mesophase formation (onset through completion), in pitch and/or pitch-based products can be determined or identified. Moreover, special variations in H/C ratio can be made using the methods of the present disclosure by comparing the non-quenched, and thus isotropic regions, to the quenched, and thus mesophase regions. That is, by use of optical imaging, the methods of the present disclosure enable direct identification (and monitoring) of regions with increased π-interactions and, by proxy, spatial variations in hydrogen content, which subsequently affects the rheology of the pitch or pitch-based product (e.g., heterogeneous softening point temperatures, extensional viscosities, and the like).

In one or more other aspects, by use of optical imaging, in combination with fluorescence light interaction, direct identification of the regions of π-interactions, and thus mesophase formation (onset through completion), in pitch and/or pitch-based products can be monitored in real time or otherwise periodically (e.g., every 5 minutes or every 30 minutes, or every hour) during production processes, such as those in which loss of hydrogen-rich side chains is undesirable. In such instances, pyrolysis can be ceased upon detecting the onset of mesophase formation. In other aspects, by use of optical imaging, in combination with fluorescence light interaction, direct identification of the regions of π-interactions, and thus mesophase formation (onset through completion), in pitch and/or pitch-based products can be monitored in real time or period during production processes, such as those in which loss of hydrogen is desirable, where spatial variations are also monitored.

In one or more aspects, by use of optical and/or fluorescent detectors (e.g., microscope, digital cameras, and the like, and any combination thereof) or fiber-optic fluorescent imaging may be used for direct identification of the regions of increased π-interactions, and thus mesophase formation (onset through completion), in pitch and/or pitch-based products can be monitored in real time or periodically during production processes, such as those in which loss of hydrogen is undesirable. As a carbon fiber is produced, for example, a UV light source and corresponding detector (e.g., optical or fluorescent, for example) may be configured over a specific region of interest via a window or fiber optic coupling in a feed line. In certain instances, this is valuable in a mesophase production setting, where the continuous conversion of a pitch to mesophase would need to be carefully monitored or, conversely, in a vis-breaker where mesophase production must be avoided to prevent fouling and coking, hindering production and reliability.

The fluorescent light may have light having a wavelength of about 10 nanometers to about 1400 nm, encompassing any value and subset therebetween, such as about 10 nm to about 280 nm, or about 280 nm to about 560 nm, or about 560 nm to about 840 nm, or about 840 nm to about 1,120 nm, or about 1,120 nm to about 1,400 nm. The fluorescent light may be any electromagnetic radiation, and may include fluorescent light from electrons, x-rays, and the like, and any combination thereof.

The normalized fluorescence intensity ($I/I_0$) may be in the range of about 0.4 to about 0.7 at a wavelength in the range of about 430 nm to about 470 nm (e.g., band of light centered at 450 nm) and for an exposure of about 1.5 seconds, encompassing any value and subset therebetween, via a 20×/0.5 NA air objective lens.

Pyrolysis of pitch may be ceased upon identification of fluorescent light emissions corresponding with a particular H/C Ratio. For example, pyrolysis may be ceased upon evaluation of a reflected light spectrum and identifying an H/C Ratio in the range of about 0.5 to about 1.05, encompassing any value and subset therebetween, representing an appropriate H/C Ratio for carbon fiber production.

In certain aspects, pyrolysis of pitch may be ceased upon identification of fluorescent light emissions having a particular No and H/C Ratio. For example, pyrolysis may be ceased upon detection of an intensity in the range of about 0.5 to about 0.7 at a wavelength in the range of about 430 nm to about 470 nm (e.g., band of light centered at 450 nm) and for an exposure of about 1.5 seconds, encompassing any value and subset therebetween, and evaluation of a emitted light spectrum having a H/C Ratio is in the range of about 0.5 to about 1.05, encompassing any value and subset therebetween, representing a combined No and H/C Ratio appropriate for carbon fiber production.

In mesophase pitch samples, the fluorescent spectra of the isotropic phase indicates strong absorption in the deep-UV band, with fluorescent emissions across the optically visible range, from violet to blue and even red.

Figure 1B:
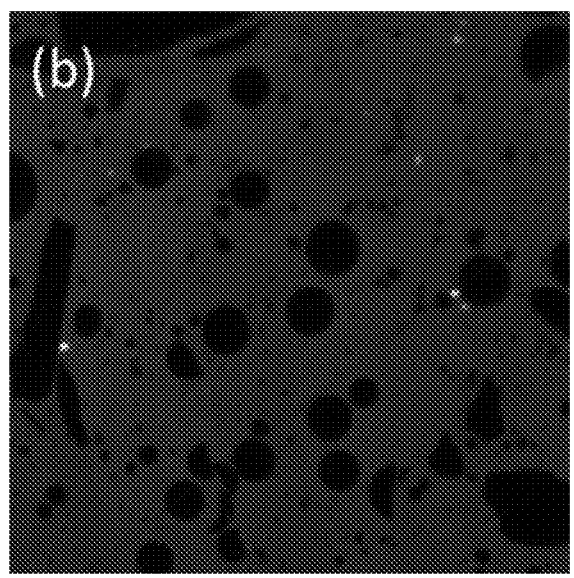
FIGS. 1B and 1C are fluorescent micrographs of the mesophase pitch sample of FIG. 1A acquired via fluorescent light excitation, according to one or more aspects of the present disclosure.
Figure 1C:
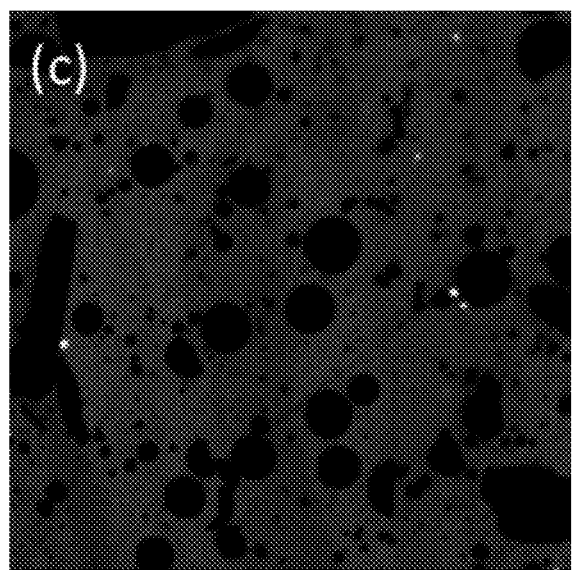

Referring now to FIG. 1A-1C, illustrated is a comparison between reflected cross-polarized light and fluorescent light micrographs of a mesophase pitch sample embedded in epoxy: FIG. 1A is an optical micrograph acquired using reflected cross-polarized light via a full waveplate under white light, with digital contrast enhancement for clarity; FIG. 1B is a fluorescent light image captured via 450-490 nm wavelength band-pass excitation filter and 515 nm wavelength long-pass filter, with digitally enhanced image contrast for clarity; FIG. 1C was captured per the parameters of FIG. 1B, but with further digital contrast enhancement highlighting intensity variations within the amorphous optically isotropic phase (the lighter portions). Each of the micrographs were captured over the same region of interest using a 20×/0.50 NA air objective lens.

As shown, FIGS. 1A-1C compare cross-polarized light and fluorescent light micrographs for a piece of pitch within the same region of interest. The fluorescent light micrographs in FIGS. 1B and 1C were captured using fluorescent excitation light from 450 nm to 490 nm. FIG. 1C includes enhanced contrast (compared to FIG. 1B) to highlight the variations in emission intensity within the isotropic (amorphous) phase that are due to quenching as a result of increased π-interactions (and this contrast is influenced by the quality of blending (i.e., homogeneity)). As for the mesophase formation, its liquid crystallinity, which results in the birefringence shown in the droplets of FIG. 1A, ensures that the π-interactions are more consistent and uniform throughout the phase, resulting in virtually complete fluorescent quenching, as shown in FIGS. 1B and 1C.

Referring now to FIG. 2, illustrated is a fluorescence spectrum of a toluene-soluble fraction of optically isotropic (amorphous) M-50 pitch (10 parts per million (ppm)), with excitation/absorption spanning the deep-UV to visible range, and emissions spanning the full visible range. With pyrolysis, molecules lose hydrogen-rich side chains, increasing the exposure of their aromatic cores to π-interactions with surrounding aromatic molecules. As described above, the increased propensity for π-interactions enables electronic interactions (e.g., Dexter energy transfer), resulting in fluorescence quenching. The quenching within the isotropic (amorphous) phase can be seen in FIGS. 1B and 1C.

Referring now to FIGS. 3A and 3B, illustrated are fluorescent light micrographs captured via a 450-490 nm band-pass excitation filter, 515 nm long-pass filter, via a 20×/0.50 NA air objective lens, with image contrast enhanced digitally to highlight intensity variations within mesophase (dark regions). The samples shown demonstrate mesophase droplets that have coalesced into a liquid continuum. As observed in FIG. 3B, variations in fluorescent intensity demonstrate variations in quenching despite being liquid crystalline and birefringent, as shown in FIG. 3A. This demonstrates that there are variations in composition within the mesophase state, and in the isotropic phase, as shown in FIGS. 1B and 1C.

The image data described herein provides a foundation that the observed fluorescent intensity variations, in both the isotropic and mesophase states, are coupled with rheological variations as well. For example, as shown in FIG. 3B, the elongation of the isotropic droplets within the mesophase state suggest that the sample was experiencing shear as it was thermally quenched and solidified. The appearance of the lighter shaded mesophase state indicates shear-banding, meaning that the less fluorescently quenched mesophase state has a different shear viscosity than the darkest mesophase state, believed to be due to weaker π-interactions. Similarly, the fluorescently quenched regions depicted in FIG. 1C seem to correspond to flow domains, supporting the correlation between fluorescent quenching and viscosity.

Figure 4A:
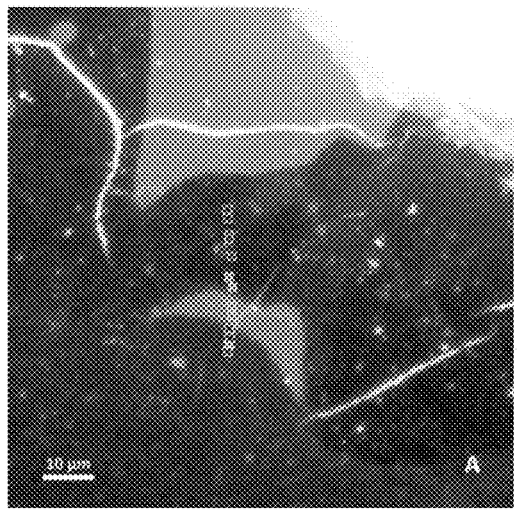
FIG. 4A is a fluorescent micrograph of a pitch sample labeled with points indicating where infrared (IR) spectra were obtained using an optical photothermal IR (O-PTIR) microscope, according to one or more aspects of the present disclosure.
Figure 4B:
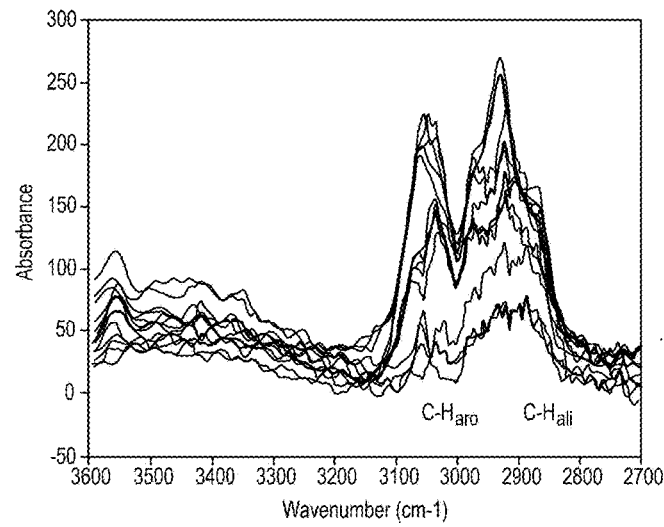
FIGS. 4B and 4C show the IR spectra and Raman intensity variation of the pitch sample of FIG. 4A.
Figure 4C:
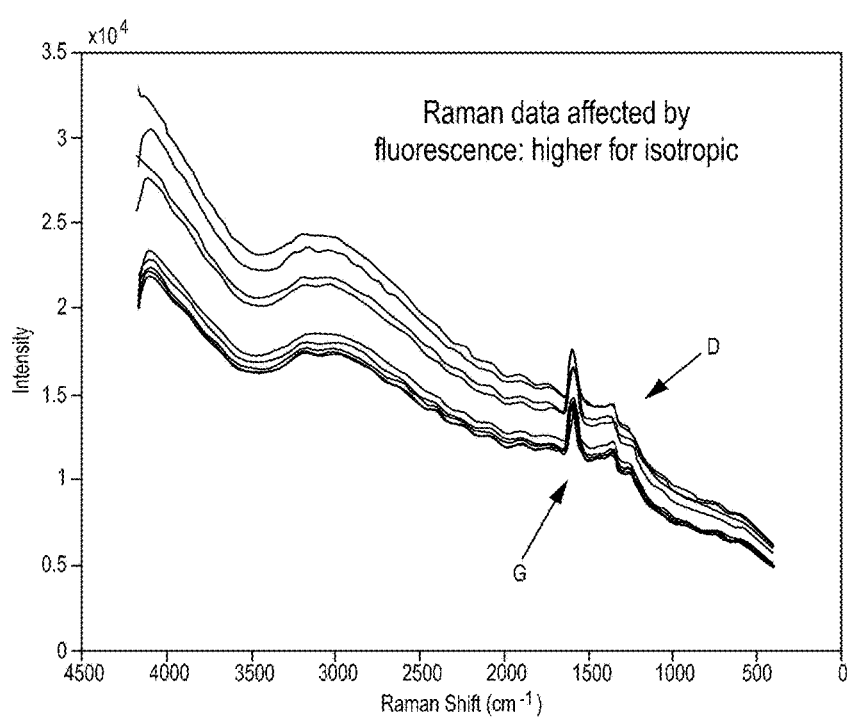

Referring now to FIGS. 4A-4B, the variations in composition as described herein can be verified using infrared (IR) spectroscopy. FIG. 4A shows a fluorescent light micrograph of pitch. Significantly, the ratio of molecular aromaticity to aliphaticity within a given region of interest is inversely proportional to its measured fluorescent intensity; higher concentrations of highly aromatic molecules will have higher concentrations of π-π interactions, increasing the prevalence of fluorescent quenching. This relationship is depicted by the IR spectra shown in FIG. 4B, which were measured from specific points within the sample depicted by the fluorescence light micrograph in FIG. 4A, which contains 3 phases of pitch: isotropic pitch, mesophase pitch with partial quenching, and mesophase pitch with virtually total quenching. There are variations in the IR absorbance in the aromatic C—H stretching and aliphatic C—H stretching vibrational mode (associated with CH $_3$ and CH$_2$). In addition, FIG. 4C shows the Raman intensity variation between amorphous and mesophase pitches. Here, the baseline is tilted for amorphous pitch compared to the flat baseline of the mesophase pitch, where the tilt is a result of the residual fluorescence emitted in response to a 532 nm O-PTIR laser probe.

The variations in composition as described herein can be verified using optical-photothermal infrared (O-PTIR) microscopy, which highlights variations in molecular aromaticity and aliphaticity between different phases of the pitch. As described above, the ratio of molecular aromaticity to aliphaticity within a given region of interest is inversely proportional to its measured fluorescent intensity; higher concentrations of highly aromatic molecules will have higher concentrations of π-π interactions, increasing the prevalence of fluorescent quenching. This relationship can be described by RGB imagery. A composite of IR spectra measured using 3 different wavenumbers may be obtained: the red (R) channel's intensity corresponding to wavenumber 3050 cm$^{-1}$ with a scale of 800 mV; the green (G) channel's intensity corresponding to wavenumber 2929 cm$^{-1}$ with a scale of 1200 mV; and the blue (B) channel's intensity corresponding to wavenumber 2878 cm$^{-1}$ with a scale of 750 mV. A wavenumber of 3050 cm$^{-1}$ corresponds to stretching in aromatic C—H bands, 2929 cm$^{-1}$ corresponds with asymmetrical stretching in CH$_2$, and 2878 cm$^{-1}$ corresponds with symmetrical stretching in CH$_3$. As described above, with reference to FIGS. 4A-4C, aliphatic C—H stretching are represented by the green and blue pixels. Therefore, the red regions of a composite image corresponds with greater aromaticity than the rest of the image, likewise corresponding with the mesophase.

Figure 5:
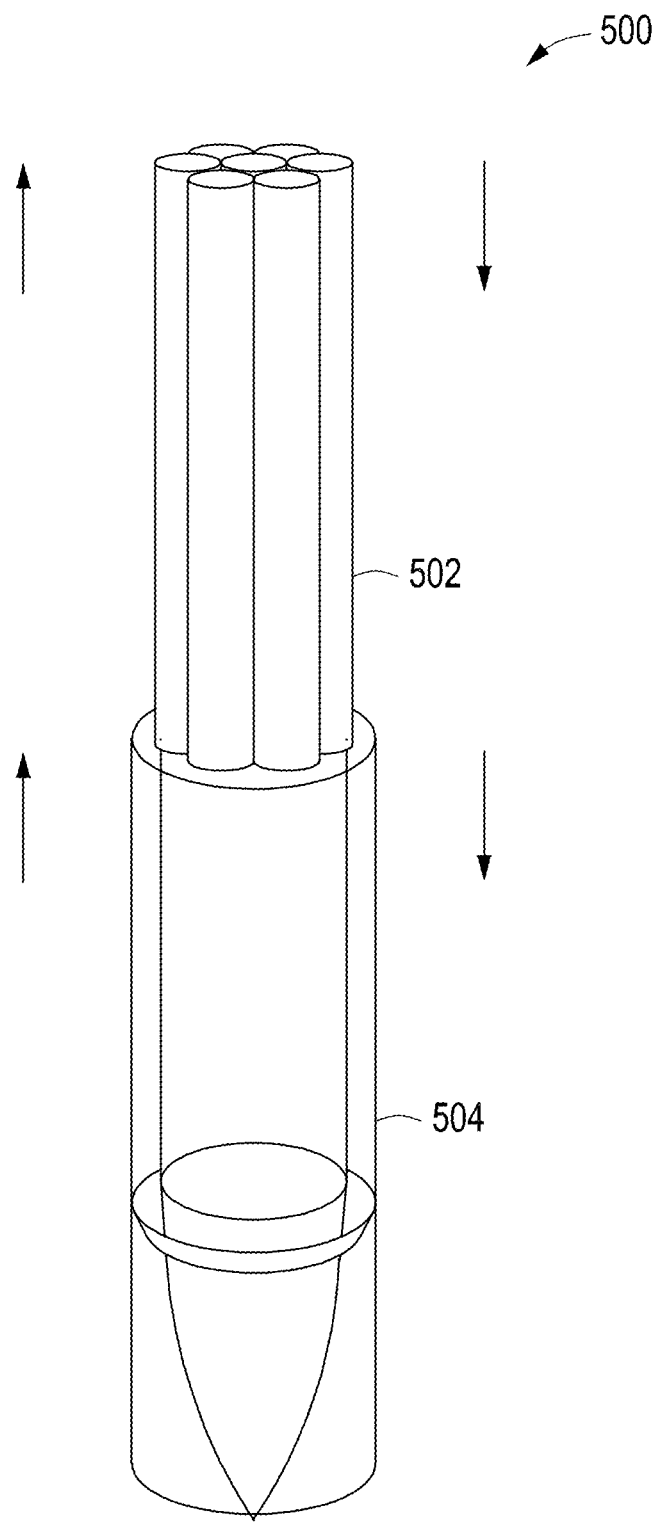
FIG. 5 shows a schematic of a device based on a fiber optic bundle for fluorescent light detection or imaging, according to one or more aspects of the present disclosure.

The total intensity of emitted light over a region of interest is inversely proportional to the amount of mesophase formation within a pitch sample. Therefore, the methods described herein are applicable beyond merely imaging via optical microscopy, as provided hereinabove with respect to continuous monitoring of mesophase formation as a carbon fiber is produced. It is to be noted that continuous production of mesophase is applicable to other applications, such as batteries, without departing from the scope of the present disclosure. The quantity of mesophase can be monitored directly and in real-time using a simple array of UV light reflected diode (LED) lights in tandem with a blue-light detector, for example. Additionally, in a production setting such as a vis-breaker for fuel production, a bundle of optical fibers may be fed into feed lines discretely to transmit both excitation light and detect corresponding fluorescent emissions to an attached optic and detector. For example, as shown in FIG. 5, illustrated is a carbon fiber system 500. System 500 comprises fiber bundle 502 of optical fibers upstream of imaging optics 504. The fiber bundle 502 may provide excitation light to a pitch sample, which may be detected by the imaging optics 504. As shown, emitted light (down arrows) travel through the fiber bundle 502 to the imaging optics 504 and back up to a detector (not shown).

Accordingly, the present disclosure provides capabilities of providing distinction between regions or domains that are optically isotropic or anisotropic.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

EXAMPLE EMBODIMENTS

Nonlimiting example embodiments of the present disclosure include:

Embodiment A: A method comprising: interacting fluorescent light with a pitch composition; receiving fluorescence emissions from the pitch composition; and detecting the onset of mesophase formation upon detecting a normalized fluorescence intensity ($I/I_0$) of the fluorescent light emissions in the range of about 0.4 to about 0.7 at a wavelength in the range of about 430 nm to about 470 nm for an exposure of about 1.5 seconds.

Embodiment B: A method comprising: interacting fluorescent light with a pitch composition; receiving fluorescence emissions from the pitch composition; obtaining a fluorescence spectrum; and detecting the onset of mesophase formation upon detecting a normalized fluorescence intensity ($I/I_0$) of the fluorescent light emissions in the range of about 0.4 to about 0.7 at a wavelength in the range of about 430 nm to about 470 nm for an exposure of about 1.5 seconds.

Embodiment C: A composition comprising: a pitch composition, wherein when the pitch composition is interacted with fluorescent light has a normalized fluorescence intensity ($I/I_0$) of the fluorescent light emissions in the range of about 0.4 to about 0.7 at a wavelength in the range of about 430 nm to about 470 nm for an exposure of about 1.5 seconds.

Nonlimiting example Embodiments A and B may include one or more of the following elements:

Element 1: Wherein the interacting fluorescent light with a pitch composition is performed in real time or periodically as the pitch composition is pyrolyzing.

Element 2: Wherein the interacting fluorescent light with a pitch composition is performed in real time or periodically as the pitch composition is pyrolyzing, and wherein the pyrolyzing is performed at a temperature in the range of about 300° C. to about 600° C.

Element 3: Wherein the interacting fluorescent light with a pitch composition is performed in real time or periodically as the pitch composition is pyrolyzing, and wherein the pyrolyzing is performed during carbon fiber production.

Element 4: Wherein the interacting fluorescent light with a pitch composition is performed in real time or periodically as the pitch composition is pyrolyzing, and further comprising ceasing the pyrolyzing upon detecting the onset of mesophase formation.

Element 5: Wherein the interacting fluorescent light with a pitch composition is performed in real time or periodically as the pitch composition is pyrolyzing, and further comprising continuing the pyrolyzing until the No is in the range of about 0.4 to about 0.7 at a wavelength in the range of about 430 nm to about 470 nm for an exposure of about 1.5 seconds.

Element 6: Further comprising identifying a hydrogen to carbon ratio (H/C Ratio) based on the fluorescent emissions.

Element 7: Further comprising identifying a hydrogen to carbon ratio (H/C Ratio) based on the fluorescent emissions, and wherein the interacting fluorescent light with a pitch composition is performed in real-time as the pitch composition is pyrolyzing, and further comprising continuing the pyrolyzing until the H/C Ratio is in the range of about 0.5 to about 1.05.

Element 8: Further comprising identifying a hydrogen to carbon ratio (H/C Ratio) based on the fluorescent emissions, and wherein the interacting fluorescent light with a pitch composition is performed in real-time as the pitch composition is pyrolyzing, and further comprising continuing the pyrolyzing until the No is in the range of about 0.4 to about 0.7 at a wavelength in the range of about 430 nm to about 470 nm for an exposure of about 1.5 seconds, and the H/C Ratio is in the range of about 0.5 to about 1.05.

Element 9: Wherein the interacting fluorescent light has a wavelength in the range of about nanometers (nm) to about 1,400 nm.

Element 10: Wherein the interacting fluorescent light has a wavelength in the range of about 700 nm to about 1,400 nm.

Element 11: Wherein the onset of mesophase formation correlates to the generation of π-interactions.

By way of non-limiting example, exemplary combinations applicable to A and B include any combination of 1 and 2-11; 2 and 3-11; 3 and 4-11; 4 and 5-11; 5 and 6-11; 6 and 7-11; 7 and 8-11; 8 and 9-11; 9 and 10-11; and 10 and 11; or any combination of 1-11 without limitation.

Nonlimiting example Embodiment B may include the following element alone or in addition to any of Elements 1-11 in any combination:

Element 12: Wherein the fluorescence spectrum is obtained by a method consisting of optical imaging, fluorescence imaging, fluorescence spectrophotometer, fiberoptic detection, and any combination thereof.

Nonlimiting example Embodiment C may include the following elements:

Element 13: Wherein the pitch composition is interacted with fluorescent light in real time or periodically as the pitch composition is pyrolyzing.

Element 14: Wherein the pitch composition is interacted with fluorescent light in real time or periodically as the pitch composition is pyrolyzing, and wherein the pyrolyzing is performed at a temperature in the range of about 300° C. to about 600° C.

Element 15: Wherein the pitch composition is interacted with fluorescent light in real time or periodically as the pitch composition is pyrolyzing, and wherein the pyrolyzing is performed during carbon fiber production.

Element 16: Wherein the pitch composition is interacted with fluorescent light in real time or periodically as the pitch composition is pyrolyzing, and further comprising ceasing the pyrolyzing upon detecting the onset of mesophase formation.

Element 17: Wherein the pitch composition is interacted with fluorescent light in real time or periodically as the pitch composition is pyrolyzing, and further comprising continuing the pyrolyzing until the No is in the range of about 0.4 to about 0.7 at a wavelength in the range of about 430 nm to about 470 nm for an exposure of about 1.5 seconds.

Element 18: Wherein the pitch composition has an H/C Ratio in the range of about 0.5 to about 1.05.

Element 19: Wherein the fluorescent light has a wavelength in the range of about 10 nanometers (nm) to about 1,400 nm.

Element 20: Wherein the fluorescent light has a wavelength in the range of about 700 nm to about 1,400 nm.

By way of non-limiting example, exemplary combinations applicable to C include any combination of 13 and 14-20; 14 and 15-20; 15 and 16-20; 16 and 17-20; 17 and 18-20; 18 and 19-19 and 20; or any combination of 13-20 without limitation.

To facilitate a better understanding of the embodiments of the present invention, the following examples of preferred or representative embodiments are given. In no way should the following examples be read to limit, or to define, the scope of the invention.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   interacting fluorescent light with a pitch composition;
   receiving fluorescence emissions from the pitch composition;
   acquiring a fluorescent light image via a band-pass excitation filter and a long-pass emission filter of the received fluorescence emissions;
   identifying spatial variations in the fluorescent light images, wherein the spatial variations are a measure of change in a hydrogen to carbon ratio as measured according to ASTM D5291; and
   identifying mesophase region and isotropic region in the pitch composition by quantitatively characterizing variations in composition based at least in part on the hydrogen to carbon ratio.

2. The method of claim 1, wherein the interacting fluorescent light with a pitch composition is performed in real time or periodically as the pitch composition is pyrolyzing.

3. The method of claim 2, wherein the pyrolyzing is performed at a temperature in the range of about 300° C. to about 600° C.

4. The method of claim 2, wherein the pyrolyzing is performed during carbon fiber production.

5. The method of claim 2, further comprising ceasing the pyrolyzing upon detecting the onset of mesophase formation.

6. The method of claim 2, wherein the interacting fluorescent light with a pitch composition is performed in real-time as the pitch composition is pyrolyzing, and further comprising continuing the pyrolyzing until the H/C Ratio is in the range of about 0.5 to about 1.05.

7. The method of claim 2, wherein the interacting fluorescent light with a pitch composition is performed in real-time as the pitch composition is pyrolyzing, and further comprising continuing the pyrolyzing until the $I/I_0$ is in the range of about 0.4 to about 0.7 at a wavelength in the range of about 430 nm to about 470 nm for an exposure of about 1.5 seconds, and the H/C Ratio is in the range of about 0.5 to about 1.05.

8. The method of claim 1, wherein the interacting fluorescent light has a wavelength in the range of about 10 nanometers (nm) to about 1400 nm.

9. The method of claim 8, wherein the interacting fluorescent light has a wavelength in the range of about 700 nm to about 1400 nm.

10. A method comprising:
    interacting fluorescent light with a pitch composition;
    receiving fluorescence emissions from the pitch composition;
    acquiring a fluorescent light image via a band-pass excitation filter and a long-pass emission filter of the received fluorescence emissions;
    subjecting the fluorescent light image to digital contrast enhancement;
    identifying spatial variations in the fluorescent light images, wherein the spatial variations are a measure of change in a hydrogen to carbon ratio as measured according to ASTM D5291; and
    identifying mesophase region and isotropic region in the pitch composition by quantitatively characterizing variations in composition based at least in part on the hydrogen to carbon ratio.

11. The method of claim 10, wherein the interacting fluorescent light with a pitch composition is performed in real time or periodically as the pitch composition is pyrolyzing.

12. The method of claim 11, wherein the pyrolyzing is performed at a temperature in the range of about 300° C. to about 600° C.

13. The method of claim 11, wherein the pyrolyzing is performed during carbon fiber production.

14. The method of claim 11, further comprising ceasing the pyrolyzing upon detecting the onset of mesophase formation.

15. The method of claim 10, wherein the interacting fluorescent light with a pitch composition is performed in real-time as the pitch composition is pyrolyzing, and further comprising continuing the pyrolyzing until the H/C Ratio is in the range of about 0.5 to about 1.05.

16. The method of claim 10, wherein the interacting fluorescent light with a pitch composition is performed in real-time as the pitch composition is pyrolyzing, and further comprising continuing the pyrolyzing until normalized fluorescent intensity ($I/I_0$) is in the range of about 0.4 to about 0.7 at a wavelength in the range of about 430 nm to about 470 nm for an exposure of about 1.5 seconds, and the hydrogen to carbon ratio (H/C Ratio) is in the range of about 0.5 to about 1.05.

17. The method of claim 10, wherein the onset of mesophase formation correlates to the generation of $\pi$-interactions.

18. A method comprising:
    interacting fluorescent light with a pitch composition;
    capturing fluorescence emissions from the pitch composition;
    acquiring a fluorescent light image from the captured fluorescence emissions;
    identifying spatial variations in the fluorescent light images, wherein the spatial variations are a measure of change in a hydrogen to carbon ratio as measured according to ASTM D5291; and
    identifying mesophase region and isotropic region in the pitch composition by quantitatively characterizing variations in composition based at least in part on the hydrogen to carbon ratio.

* * * * *